United States Patent
Shitrit et al.

(10) Patent No.: US 11,312,078 B2
(45) Date of Patent: Apr. 26, 2022

(54) WASTE DISPOSAL FOR ADDITIVE MANUFACTURE

(71) Applicant: Stratasys Ltd., Rehovot (IL)

(72) Inventors: Yaniv Shitrit, Ashkelon (IL); Boris Belocon, Rehovot (IL); Gal Begun, Mevasseret Zion (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/258,500

(22) PCT Filed: Jul. 8, 2019

(86) PCT No.: PCT/IL2019/050761
§ 371 (c)(1),
(2) Date: Jan. 7, 2021

(87) PCT Pub. No.: WO2020/012468
PCT Pub. Date: Jan. 16, 2020

(65) Prior Publication Data
US 2021/0245440 A1 Aug. 12, 2021

Related U.S. Application Data

(60) Provisional application No. 62/695,211, filed on Jul. 9, 2018.

(51) Int. Cl.
*B29C 64/35* (2017.01)
*B33Y 10/00* (2015.01)
(Continued)

(52) U.S. Cl.
CPC ............ *B29C 64/35* (2017.08); *B29C 64/209* (2017.08); *B33Y 10/00* (2014.12); *B33Y 30/00* (2014.12); *B33Y 40/00* (2014.12)

(58) Field of Classification Search
CPC ... B29C 64/135; B29C 64/165; B29C 64/209; B29C 64/35; B33Y 10/00; B33Y 30/00; B33Y 40/00
See application file for complete search history.

(56) References Cited

U.S. PATENT DOCUMENTS

| 5,204,124 A | 4/1993 | Secretan et al. |
| 7,118,206 B1 | 10/2006 | Stockwell et al. |

(Continued)

FOREIGN PATENT DOCUMENTS

| CN | 106003715 | 10/2016 |
| CN | 108025489 | 5/2018 |

(Continued)

OTHER PUBLICATIONS

International Search Report and the Written Opinion dated Oct. 7, 2019 From the International Searching Authority Re. Application No. PCT/IL2019/050761. (16 Pages).

(Continued)

*Primary Examiner* — Joseph S Del Sole
*Assistant Examiner* — Manley L Cummins, IV

(57) ABSTRACT

A waste curing device to cure waste generated by an additive manufacturing system, the waste curing device comprising: a container for receiving the waste; a movable cover positioned above the container; one or more waste nozzles mounted on the moveable cover and configured to deliver waste into the container; a static cover positioned above the container and below the movable cover; one or more curing sources mounted on the static cover and configured to provide curing radiation to cure the waste in the container; wherein the movable cover is configured to move relative to the static cover to provide an open position for the waste (Continued)

nozzles to deliver waste into the container, and subsequently to a closed position, to shield the waste nozzles from curing radiation.

9 Claims, 13 Drawing Sheets

(51) Int. Cl.
*B33Y 30/00* (2015.01)
*B33Y 40/00* (2020.01)
*B29C 64/209* (2017.01)

(56) References Cited

U.S. PATENT DOCUMENTS

| | | | |
|---|---|---|---|
| 2003/0063138 A1 | 4/2003 | Varnon et al. | |
| 2003/0209836 A1* | 11/2003 | Sherwood | G03F 7/0037 264/401 |
| 2005/0104241 A1 | 5/2005 | Kritchman et al. | |
| 2007/0063366 A1* | 3/2007 | Cunningham | B29C 64/35 264/37.1 |
| 2010/0247703 A1 | 9/2010 | Shi et al. | |
| 2010/0249486 A1 | 9/2010 | Bar Nathan et al. | |
| 2017/0021452 A1 | 1/2017 | Tanaka et al. | |

FOREIGN PATENT DOCUMENTS

| | | |
|---|---|---|
| WO | WO 2017/009833 | 1/2017 |
| WO | WO 2020/012468 | 1/2020 |

OTHER PUBLICATIONS

International Preliminary Report on Patentability dated Jan. 21, 2021 From the International Bureau of WIPO Re. Application No. PCT/IL2019/050761. (10 Pages).
Communication Pursuant to Article 94(3) EPC dated Nov. 18, 2021 From the European Patent Office Re. Application No. 19742961.6. (3 Pages).
Notification of Office Action and Search Report dated Feb. 8, 2022 From the State Intellectual Property Office of the People's Republic of China Re. Application No. 20198004855.1. (6 Pages).

* cited by examiner

WASTE DISPOSAL FOR ADDITIVE MANUFACTURE

RELATED APPLICATIONS

This application is a National Phase of PCT Patent Application No. PCT/IL2019/050761 having International filing date of Jul. 8, 2019, which claims the benefit of priority under 35 USC § 119(e) of U.S. Provisional Patent Application No. 62/695,211 filed on Jul. 9, 2018. The contents of the above applications are all incorporated by reference as if fully set forth herein in their entirety.

FIELD AND BACKGROUND OF THE INVENTION

The present invention, in some embodiments thereof, relates to a method and apparatus for waste disposal in additive manufacture and, more particularly, but not exclusively, to effective ways of curing waste of building material for environmentally safe disposal.

Additive manufacture, is a technology which has been developed and improved over the last two decades and is now practical and useful for industrial applications. Additive manufacturing builds objects from the bottom-up by depositing building materials layer-by-layer, thus forming three-dimensional (3D) objects, including objects with complex geometries.

Some additive manufacturing techniques are carried out using building materials which are jetted in liquid form via printing head nozzles, e.g. an array of nozzles, i.e. orifices, on the orifice plate of each printing head to form a layer of a 3D structure that is being built. The layer is straightened with a roller to provide a flat and consistent layer surface for the subsequent layer, and/or ensure a consistent layer thickness for each layer, and following straightening with the roller, the layer is cured to solidify the layer of building material.

Provision of a consistent layer surface and/or ensuring consistent layer thickness entails removal of the required amount of building material from each deposited layer. The roller thus generates a significant amount of waste material, for example about 5-50% of the volume of the deposited building material. Additional building material waste is generated by printing head maintenance procedures such as purging the printing heads, e.g. jetting of building materials via all printing heads, to clear printing head nozzles of building material residue.

Waste generated by the above processes includes waste in liquid form and/or at least partially solidified form. Unsolidified, i.e. incompletely solidified building material waste is considered a hazardous substance and is required to be stored and disposed of in an environmentally safe manner. Therefore, such building material waste must be disposed of using special waste disposal techniques.

Generation of a significant amount of waste material during or after each printing job is a considerable operational overhead and environmentally safe disposal is costly and strategically complicated. In some current practices such waste is collected and pumped into a container which, when full, is shipped to a specialized disposal facility, which treats the waste and disposes of it in an appropriate, environmentally friendly manner.

While waste building material in liquid form (or only partially solidified form) is considered hazardous, fully cured building material is generally not considered as hazardous and can be disposed of under less stringent disposal conditions. International Patent Application No. WO2017009833A1 of the same Applicant and incorporated herein by reference, discloses a waste ink collection device that collects waste building material generated by the printing process, or printing head cleaning and other incidental operations, for curing and removal.

SUMMARY OF THE INVENTION

According to a first aspect of the present invention there is provided a waste curing device to cure waste generated by an additive manufacturing system, the waste curing device comprising: a container for receiving the waste; a movable cover positioned above the container; one or more waste nozzles mounted on the moveable cover and configured to deliver waste into the container; a static cover positioned above the container and below the movable cover; one or more curing sources mounted on the static cover and configured to provide curing radiation to cure the waste in the container; wherein the movable cover is configured to move relative to the static cover to provide an open position for the waste nozzles to deliver waste into the container, and subsequently to a closed position, to shield the waste nozzles from curing radiation.

Embodiments may comprise a controller configured to control relative movement of the movable cover and to control delivery of a predetermined amount of waste by the waste nozzles into the container.

According to a second aspect of the present invention there is provided a waste curing device to cure waste generated by an additive manufacturing system, the waste curing device comprising: a container for receiving the waste; one or more curing sources configured to provide curing radiation to cure the waste in the container; and a controller configured to control the curing source to provide the curing radiation, and to introduce a delay between receipt of waste by the container after a predetermined amount of waste has been delivered to the container, and the operation of the curing source for the provision of curing radiation by the one or more curing sources.

In embodiments, the predetermined amount of waste is gauged by a change in weight of the waste and/or a change of height of the waste in the container.

In embodiments, the controller may operate the one or more curing sources for at least the amount of time needed to cure the predetermined amount of waste material delivered in each delivery cycle.

According to a third aspect of the present invention there is provided a method of curing waste generated by an additive manufacturing system, the method comprising: delivering the waste to a container via one or more waste nozzles; providing relative movement of one or more container covers between an open position for delivery of the waste by the waste nozzles, and a closed position for shielding the waste nozzles from radiation; and providing curing radiation via one or more curing sources for curing the waste.

The method may provide curing radiation for curing the waste after a predetermined amount of the waste has been delivered.

In embodiments, the predetermined amount of waste comprises at least one of a weight of the waste and a height of the waste in the container.

The method may comprise introducing a time delay between delivery of the predetermined amount of waste into the container and the provision of the curing radiation.

The method may comprise operating the curing sources for at least the amount of time needed to cure the predetermined amount of waste material delivered in each delivery cycle.

According to a fourth aspect of the present invention there is provided a slab of cured waste material generated by an additive manufacturing system and cured by a waste curing device, the waste material being a polymerizable building material, and the slab being at least 95% polymerized.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
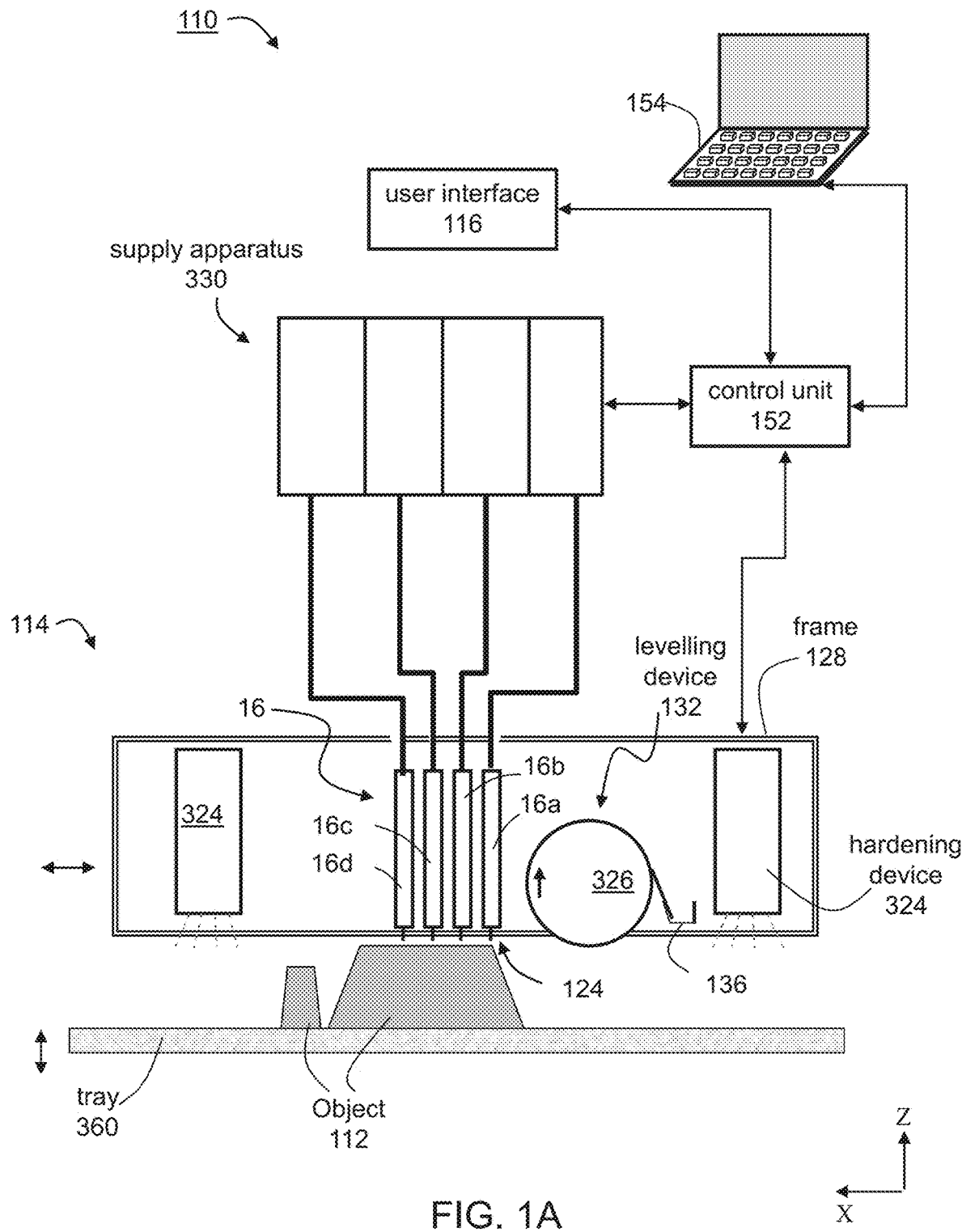
FIGS. 1A to 1I are schematic illustrations of exemplary additive manufacturing systems from which the present embodiments may be obtain waste for disposal.

The present invention, in some embodiments thereof, relates to a method and apparatus for waste disposal in additive manufacturing and, more particularly, but not exclusively, to effective ways of curing building material waste for environmentally safe disposal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manage waste generated during additive manufacturing of three-dimensional objects.

The additive manufacturing is typically, but not necessarily, based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is optionally formed by an additive manufacturing apparatus which scans a two-dimensional surface and patterns it. While scanning, the additive manufacturing apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

The AM may comprise three-dimensional printing, for example, three-dimensional inkjet printing. In three-dimensional inkjet printing, a building material formulation may be dispensed from a dispensing head having a set of nozzles to deposit building material formulation in layers on a supporting structure. The AM apparatus thus dispenses building material formulation in target locations which are to be occupied and leaves other target locations void. The AM apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves for building a matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

The AM system may optionally, but not necessarily, manufacture an object by dispensing two or more different modeling material formulations, each material formulation being dispensed from a different dispensing head or from a different channel of the dispensing head of the AM system. The material formulations can be deposited in layers during the same pass of the printing heads. The material formulations and combination of material formulations within the layer can be selected according to the desired properties of the object.

A representative and non-limiting example of a system 110 suitable for AM of an object 112 is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 1E-G described below, in fluid connection with one or more channels (not shown), through which a liquid building material formulation 124 is dispensed.

AM apparatus 114 can be a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head can be fed via one or more building material formulation reservoirs which may optionally include a temperature control unit (e.g., a temperature sensor and/or a heating device), and a material formulation level sensor. To dispense the building material formulation, a voltage signal can be applied to the dispensing heads to selectively deposit droplets of material formulation via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays can be selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative and non-limiting example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In some other embodiments, heads 16a and 16b are combined into a single dual channel print head that dispenses two distinct modeling material formulations, and heads 16c and 16d are combined into a single dual channel print head that dispenses one or more support material formulations.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5. It is further to be understood that it is not necessary for an AM apparatus to be a multi-material AM apparatus, and for a multi-material AM apparatus to have half of the dispensing nozzles for dispensing support material formulation and half of the dispensing nozzles for dispensing modeling material formulation.

It is known to the skilled artisan that the type of print heads (e.g. single channel or multiple channel) and the number of print heads used in an AM system as described above may be adapted according to several considerations such as (1) the number and the nature of the building material formulations used in the AM system; (2) the printing resolution requirement for each one of the formulations; and (3) the overall printing speed to be achieved.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction, also referred to as the built direction), typically downward. In various exemplary embodiments of the invention, AM apparatus 114 further comprises one or more leveling devices 132, e.g. a roller 326. Leveling device 326 serves to straighten, level and/or establish a thickness of the newly formed layer prior to the formation of the successive layer thereon. AM apparatus 114 optionally and preferably comprises a waste collection device 136 for collecting the excess material formulation generated during leveling. A waste collection device 136 suitable for the present embodiments is described below.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to a predetermined configuration. In the forward and/or reverse passages (or passes) of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to AM apparatus 114.

Figure 1B:
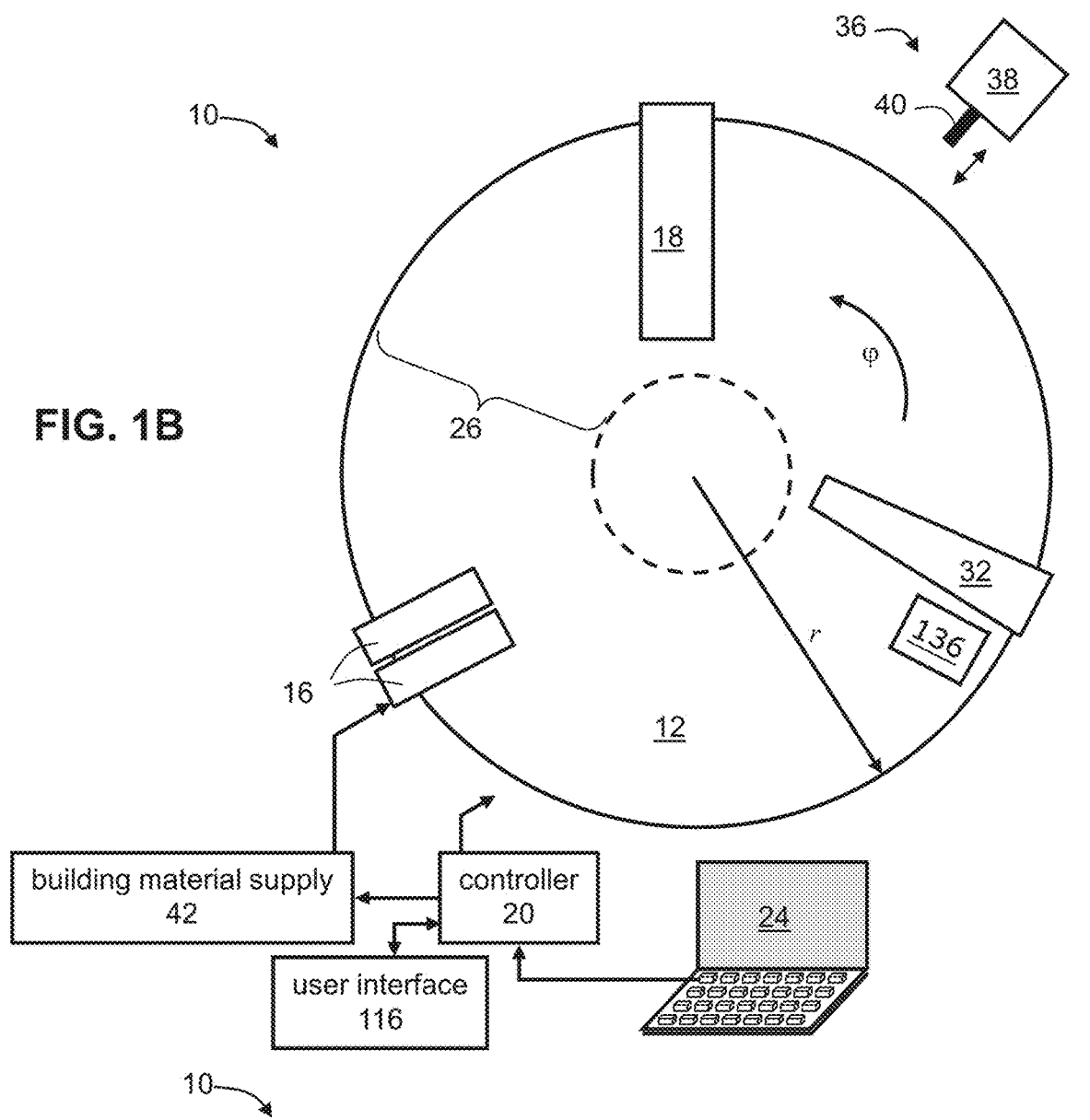
Figure 1C:
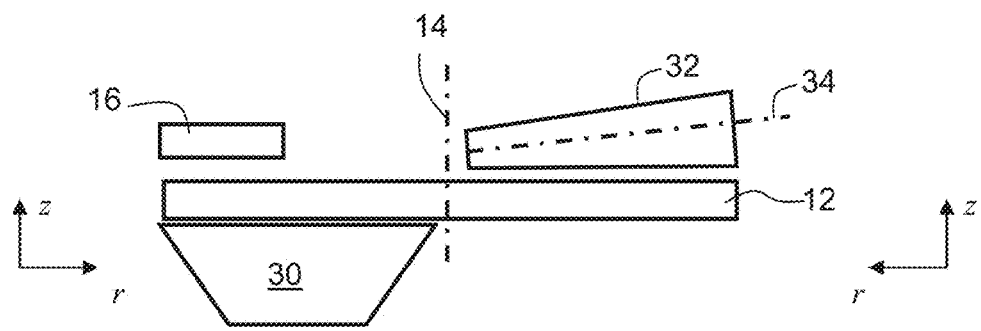
Figure 1D:
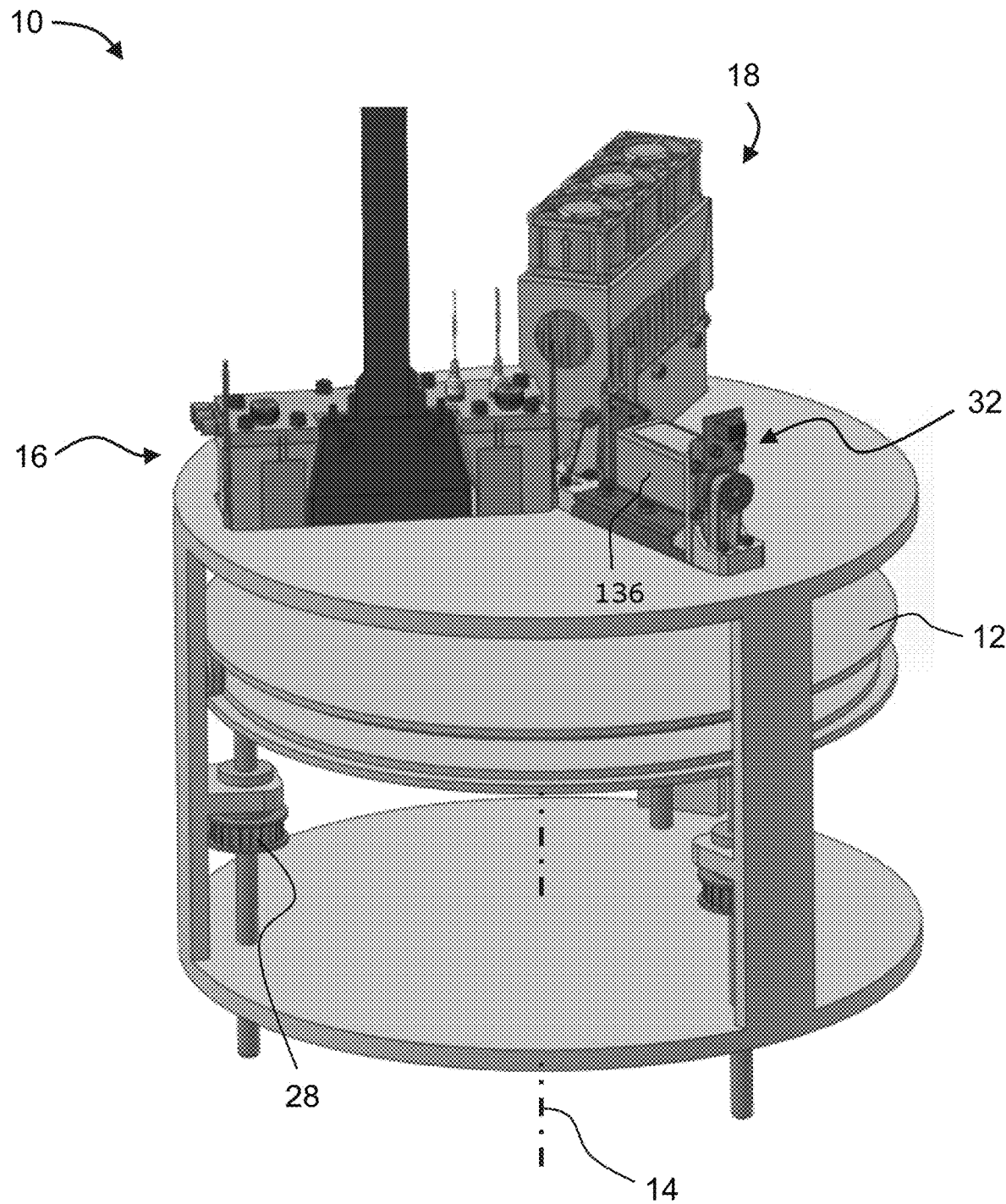
Figure 1E:
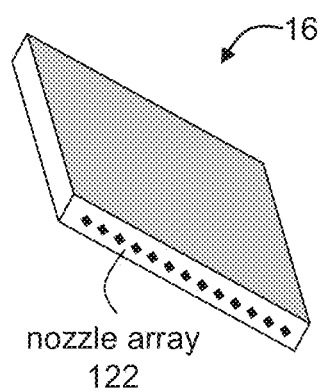
Figure 1F:
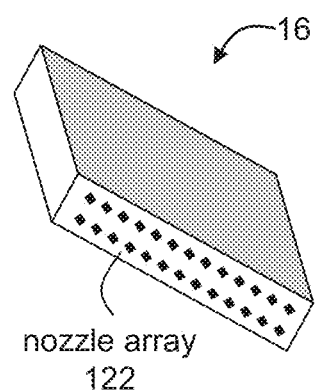
Figure 1G:
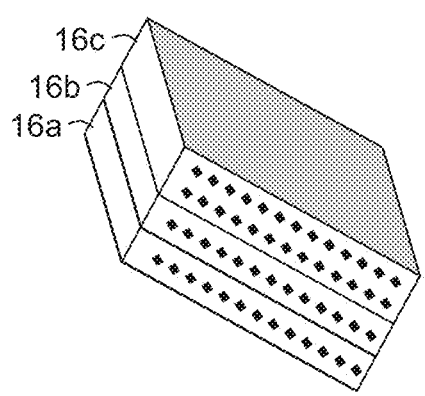

Another representative and non-limiting example of a system 10 from which the present embodiments may be obtain waste for disposal is illustrated in FIGS. 1B-D. FIGS. 1B-D illustrate a top view (FIG. 1B), a side view (FIG. 1C) and an isometric view (FIG. 1D) of system 10.

System 10 comprises a tray 12 and a plurality of inkjet printing heads 16, each having a plurality of separated nozzles. Tray 12 can have a shape of a disk or it can be annular. Non-round shapes are also contemplated for system 10.

Tray 12 and heads 16 of system 10 are optionally mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction j, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Examples for the printing head 16 are illustrated in FIGS. 1E-1G. Such heads can be employed for any of the AM systems described above, including, without limitation, system 110 and system 10.

FIGS. 1E and 1F illustrate a printing head 16 with one (FIG. 1E) and two (FIG. 1F) nozzle arrays 22. The nozzles in the array are preferably aligned linearly, along a straight line. When a particular printing head has two or more linear nozzle arrays, the nozzle arrays are optionally parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, for such a system the nozzle arrays of different printing heads are not parallel to each other but are rather at an angle to each other, which angle being approximately equal to the azimuthal offset between the respective heads. For example, one head can be oriented radially and positioned at azimuthal position $j_1$, and another head can be oriented radially and positioned at azimuthal position $j_2$. In this example, the azimuthal offset between the two heads is $j_1-j_2$, and the angle between the linear nozzle arrays of the two heads is also $j_1-j_2$.

Optionally, two or more printing heads can be assembled to a block of printing heads, in which case the printing heads of the block are typically parallel to each other. A block including several inkjet printing heads 16a, 16b, 16c is illustrated in FIG. 1G.

Optionally, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

System 10 may comprise one or more leveling devices 32 which can be manufactured as a roller or a blade. Leveling device 32 serves to straighten the newly formed layer prior to the formation of the successive layer thereon. Leveling device 32 may have the shape of a conical roller positioned such that its symmetry axis 34 is tilted relative to the surface of tray 12 and its surface is parallel to the surface of the tray, as illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

System 10 optionally and preferably comprises a waste collection device 136 for collecting the excess material formulation generated during leveling. A waste collection device 136 suitable for the present embodiments is described below.

In system 10, printing heads 16 can be configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Any of systems 10 and 110 may optionally comprise a solidifying device 18 which can include any device configured to emit light, heat or the like that may cause the deposited material formulation to harden. For example, solidifying device 18 can comprise one or more radiation sources, which can be, for example, an ultraviolet or visible or infrared lamp, or other sources of electromagnetic radiation, or electron beam source, depending on the modeling material formulation being used. The radiation source can include any type of radiation emitting device, including, without limitation, light emitting diode (LED), digital light processing (DLP) system, resistive lamp and the like. In some embodiments of the present invention, solidifying device 18 serves for curing or solidifying the modeling material formulation.

In any of systems 10 and 110, the operation of the inkjet printing heads and optionally and preferably also of one or more other components of the system, e.g., the motion of the tray, the operation of the supply system, the operation of the waste collection device, the activation, deactivation, applied voltage, and position along the vertical and/or horizontal direction of the leveling device and/or the solidifying device, etc. are controlled by a controller (shown at 20). The controller can have an electronic circuit and a non-volatile memory medium readable by the circuit, wherein the memory medium stores program instructions which, when read by the circuit, cause the circuit to perform control operations as further detailed below.

The controller preferably communicates with a data processor or host computer (shown at 24) which transmits digital data pertaining to fabrication instructions based on computer object data, e.g., a Computer-Aided Design (CAD) configuration represented on a computer readable medium in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for CAD. Typically, the controller controls the voltage applied to each dispensing head or nozzle array and the temperature of the building material formulation in the respective printing head. Generally, controller 20 controls printing heads to dispense, droplets of building material formulation in layers, such as to print a three-dimensional object. In system 10, controller 20 optionally and preferably controls the printing heads to dispense the droplets while the tray is rotating.

In some embodiments, the controller receives additional input from the operator, e.g., using data processor 24 or using a user interface 116 communicating with the controller. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

The object data formats are typically structured according to a Cartesian system of coordinates. In these cases, when system 10 is employed, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 1H:
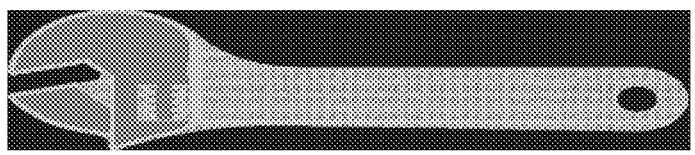
Figure 1I:
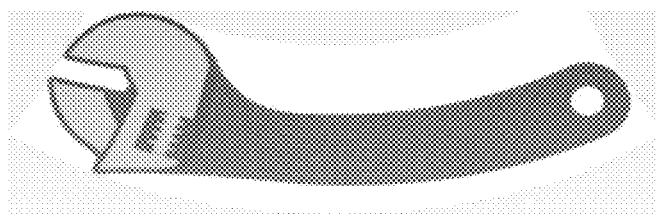

The transformation of coordinates allows three-dimensional printing over a rotating tray. In system 10, not all the nozzles of the head points cover the same distance over tray 12 during at the same time. The transformation of coordinates is can be executed so as to ensure equal amounts of excess material formulation at different radial positions. Representative examples of coordinate transformations are provided in FIGS. 1H and 1I, showing three slices of an object (each slice corresponds to fabrication instructions of a different layer of the objects), where FIG. 1H illustrates a slice in a Cartesian system of coordinates and FIG. 1I illustrates the same slice following an application of a transformation of coordinates procedure to the respective slice.

The AM system can fabricate an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

An AM system that can fabricate an object by dispensing different material formulations enable the deposition of a broad range of material formulation combinations, and the fabrication of an object which may consist of multiple different combinations of material formulations, in different parts of the object, according to the properties desired to characterize each part of the object.

Further details on the principles and operations of an AM system from which the present embodiments may be obtain waste for disposal are found in U.S. Published Application Nos. 20100191360 and 20170173886, the contents of which are hereby incorporated by reference.

As explained, building material waste, which may be modeling material and/or support material, and generally consists of uncured and/or partially cured polymer, is a hazardous material and must be disposed of using environmentally safe waste disposal techniques. The 3D printing process generates a significant amount of waste, typically about 5-50% of the volume jetted by the heads. Additional waste is also generated by head maintenance procedures such as purging.

While the waste in liquid and/or partially cured form is considered hazardous, fully cured waste is not generally considered as hazardous and may be disposed of under less stringent disposal conditions. International Patent Application No. WO2017009833 supra, discloses a waste collection technique in which the waste is stored and cured. The waste drips into a waste disposal container through waste dedicated nozzles and then UV radiation is used to cure the waste. It was found by the inventors that, UV light is liable to reflect onto the waste nozzles and cause polymerization of the waste material in the vicinity of the nozzles and thus hinder the flow of waste material through the nozzles. For example, building material, in the process of dripping through the nozzles as the UV light is operated may form "stalactites" of cured material (due to UV reflection) and besides causing obstruction of the nozzles, may affect curing efficiency by creating shadows that obstruct UV exposure in some regions of the container. Additionally, disposal of the waste container after curing assumes that the waste is fully cured. If, however, the rate of accumulation of uncured waste at some point in the process becomes more rapid than the rate of waste curing, then at least part the waste will not be fully cured.

The present embodiments aim to solve the above problems by timing the operation of curing energy, for example UV light, according to the amount of building material waste being generated, and by shielding the waste nozzles during operation of the UV light source/s. It was found that stalactite formation may be generally prevented by introducing a small delay between the steps of dripping waste into the container and the commencement of UV operation, while shielding the nozzles from UV exposure.

In some embodiments, a UV light-based curing process may be carried out every time a given, predetermined amount of waste has been pumped into the waste container, or every time a preset number of pumping operations has occurred.

According to the present embodiments, following curing, the waste building material forms a solid mass and as such is generally no longer considered hazardous, and may be disposed of under less stringent disposal conditions.

Thus the present embodiments may carry out a procedure in which the amount of waste fed into the waste container is predetermined and measured. Once a predetermined amount of the uncured waste material has been pumped into the waste container, then waste feeding is stopped. A delay is introduced to allow dripping to cease. The waste nozzles are moved horizontally to a shielded position and a further delay is introduced to allow for the waste material to spread within the container and reach an equilibrium. Curing energy is then initiated and is provided for at least the amount of time needed to cure the predetermined amount of waste material deposited during the current cycle. Curing is then stopped and the waste nozzles are moved horizontally back into their original position and feeding of the next predetermined amount of waste is initiated.

For the purposes of the waste curing procedure, a feed device provides the waste building material to a waste container. The feed device may include a pump, a distribution system for distributing the waste to waste nozzles, and waste nozzles mounted on a moveable cover. When the waste material is to be injected into the waste container, the waste nozzles are positioned above or within openings located in a static cover beneath the movable cover. During the curing step, the waste nozzles are shielded by the static cover, at a horizontal distance from the openings. In some embodiments the cover upon which the nozzles are mounted is movable relative to a static cover having openings, while in other embodiments the nozzles are mounted to a static cover and the cover having openings is movable relative thereto.

In some embodiments, the waste nozzles are inserted i.e. protrude through the openings, while in other embodiments waste nozzles are positioned above the openings. Curing energy may be provided by LED lamps mounted on the static cover and positioned at a distance from each opening for example to prevent them being stained by waste exiting the nozzles.

Figure 2:
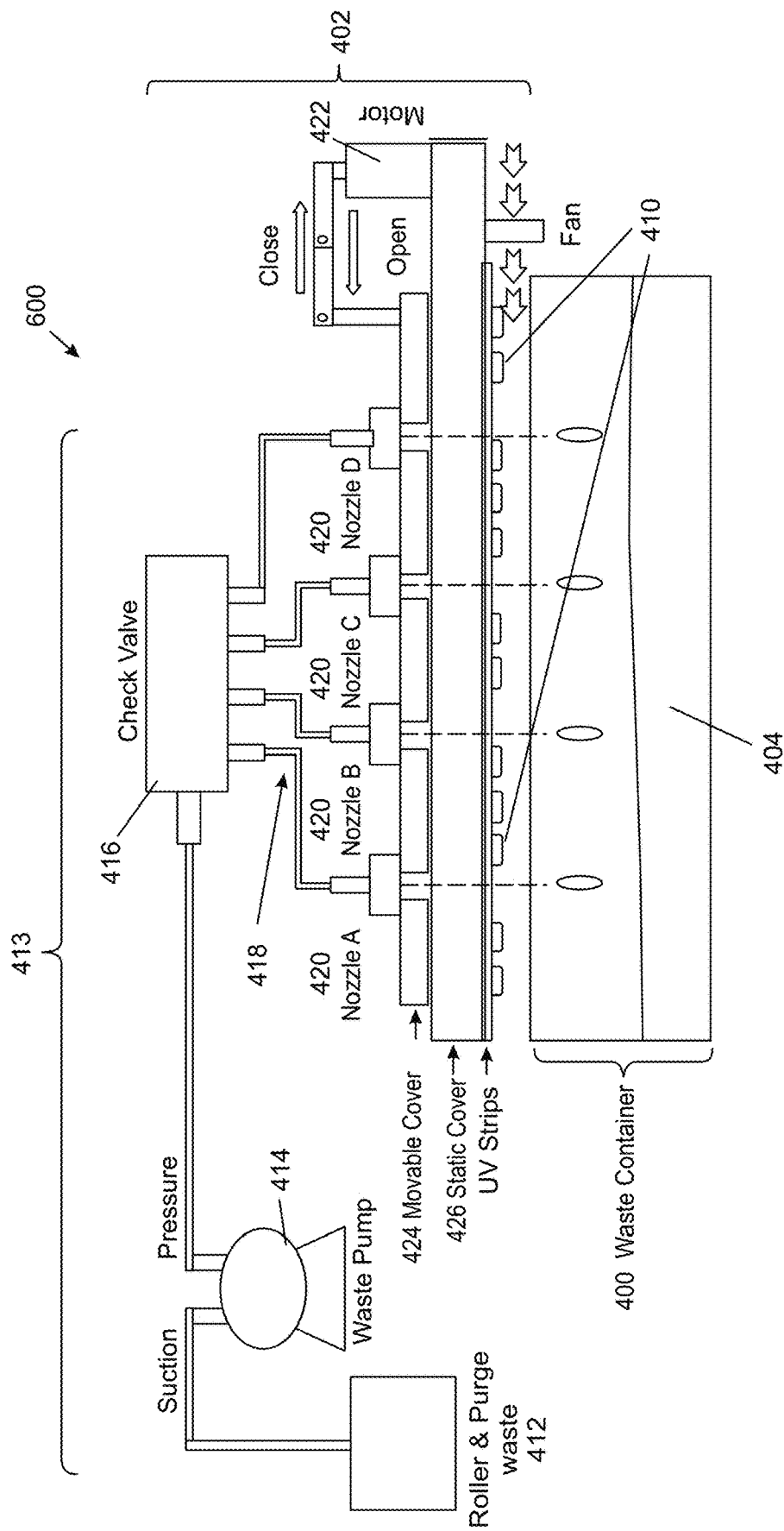
FIG. 2 is a schematic illustration of a waste disposal system according to some embodiments of the present invention.

Reference is now made to FIG. 2, which is a schematic illustration showing a waste disposal system for an additive manufacturing apparatus according to embodiments of the present invention. As discussed above with respect to FIG. 1A, additive manufacturing apparatus 114 comprises one or more leveling devices 132 such as a roller 326. Leveling device 326 serves to straighten, level and/or establish a thickness of each newly formed layer prior to the formation of the successive layer thereon. Leveling device i.e. roller 326 is associated with a waste collection device 136 for collecting excess building material during leveling. Waste collection device 136 may comprise any mechanism that collects excess building material removed by the roller during leveling, and then transfers the collected waste material to a waste curing device 600. In some embodiments, waste curing device 600 comprises a waste container 400 wherein waste material 404 is being cured, and a waste feeding and curing device 402 comprising a waste distribution system 413, a movable cover 424 upon which are mounted feeding nozzles 420, a static cover 426 having openings (not shown) and upon which are mounted energy sources, such as light emitting diodes 410.

Waste curing device 600 may be an integral part of a 3D printer or may be an external device connected to a 3D printer for example via a pipe, to handle waste generated by the printer. When part of the 3D printer, waste curing device 600 may share a controller with the 3D printer, while if external, an independent controller may be used to control waste curing device 600 separately from the 3D printer.

Waste curing device 600 is in fluid connection with the waste generating elements 412 of the 3D printer, which may include, without limitation, roller 326 of FIG. 1A and a purging system for purging of printing heads (not shown). Waste material collected from waste generating elements 412 may be directly transferred to waste curing device 600 or temporarily stored in an intermediate waste material collector (not shown). Then, the waste material is transferred to feeding and curing system 402 via distribution system 413 which comprises waste pump 414, check valve system 416, tubing 418, and waste nozzles 420. Container 400 may be in the form of a removable cartridge. In some embodiments, distribution system 413, may have a shower head construction, and may distribute the waste from inlets via tubing 418 to waste nozzles 420 distributed evenly over the surface area of the waste container 400. The idea is to dispense waste evenly over the surface of the container, as will be explained in greater detail below.

Waste curing device 600, as mentioned, cures the waste upon collection. In some embodiments, curing of the waste material 404 in waste container 400 is not performed simultaneously with the delivery of waste material 404 into waste container 400, but rather, the collection of waste uses a process which is controlled by a controller such as controller 152 in FIG. 1A. The controller may operate distribution system 413 of curing device 600 after a specified and predetermined amount of waste material 404 has been delivered to waste container 400. Thus, while delivering or depositing waste material 404, the energy source(s) 410 are turned off, and a predetermined amount of waste material 404 is delivered into container 400. After the predetermined amount of waste material 404 has been delivered, delivery or pumping of waste material is halted. After a predetermined delay, curing sources 410 are turned on for a specified amount of time needed to cure the delivered amount of waste. Curing is then halted again and delivery is resumed, until either the container is full or the container contains a specified amount of waste. Thus each predetermined amount of waste receives a constant and predetermined amount of curing energy, and thus waste collection and full solidification becomes more scalable for different speeds of operation and rates of waste production. In embodiments, timed delays may be introduced into the procedure, as will be discussed in greater detail hereinbelow.

In some embodiments, waste pump 414 may pump waste material directly from the waste generating elements 412 of the 3D printer or from an intermediate waste material collector. Check valve 416 may optionally be provided at the head of tubing system 418 which consists of a series of distribution pipes that feed waste nozzles 420 evenly distributed on a moveable cover 424. In FIG. 2, four waste nozzles 420A . . . 420D are shown by way of example but in practice a number of waste insertion nozzles is selected that is sufficient to ensure even distribution of the waste over the container. It is noted that in some embodiments the waste nozzles are simple drip nozzles, and in other embodiments are jet-forming nozzles of the kind that may be found on inkjet printing heads and which jet the waste into the tank.

In some embodiments, the specified amount of waste material that is delivered between each curing operation may be determined according to a number of pumping operations of pump 414. Alternatively, the number of waste jetting operations may be counted. As a third alternative, waste container 400 may be continually weighed and a specified change in weight may be gauged. As a further possibility, the height of the waste 404 in the container 400 may be used and a predetermined change in height may be used to indicate when delivery of waste is to be halted and for curing to begin. The skilled person will be able to find additional ways of measuring the amount of waste that has been collected.

Thus waste is delivered to waste container 400 via waste nozzles 420 when the waste nozzles are in open position, i.e. exposed above the container. The waste nozzles may then be closed in order to halt further delivery of waste during the curing process. The controller may operate actuators or a motor 422 in order to change the location of nozzles 420 and move them from an open to a close position (and vice versa)

at suitable times. Shielding waste nozzles 420 from energy source(s) 410 during curing (e.g. with static cover 426) protects waste nozzles 420 from energy radiations which otherwise might have cured waste material still present in the waste nozzles, thus blocking the nozzles.

As illustrated in the embodiment shown in FIG. 2, waste nozzles 420 are mounted on movable cover 424 which may be moved horizontally in a sliding motion powered by motor 422. A static cover 426 positioned underneath the movable cover has openings with which waste nozzles 420 may be aligned when dripping waste material. The movable cover slides between a first position where the waste nozzles are aligned with the openings to provide the waste nozzle open position, and a second position in which the waste nozzles are not aligned with the openings, i.e. are distanced from the openings, to give a waste nozzle closed position (and shielded from curing sources). In an embodiment, the movable cover is also able to move vertically towards the static cover so that the waste nozzles may be inserted through and thus protrude through the openings.

As an alternative, it is possible to provide the openings in a movable cover and to mount the waste insertion nozzles on a static cover. The effect is still the same, and the nozzles are aligned with the openings when in open position and shielded from stray radiation in the closed position.

Waste curing device 402 includes energy/curing sources 410 which are preferably evenly distributed over waste container 400. Curing sources 410 may typically be LEDs that generate an energy via UV light. The LEDs may be provided as banks or strips. The LEDs may be offset from the waste nozzles or nozzle openings, as will be discussed in greater detail below.

Figure 3A:
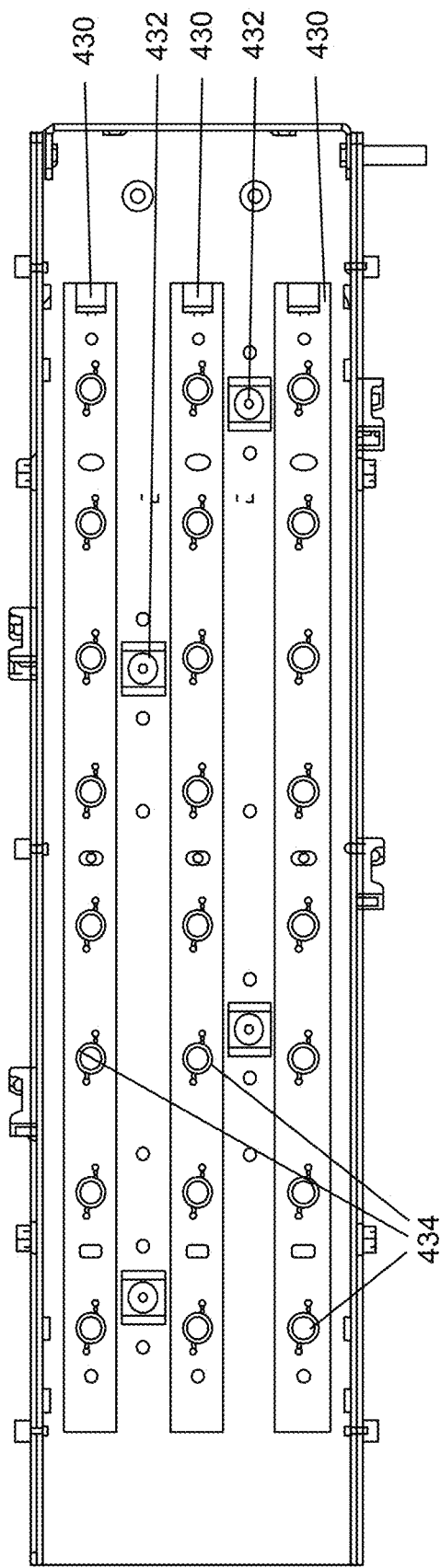
FIGS. 3A and 3B are schematic illustrations showing an under view of an embodiment of a static cover for the waste disposal system of FIG. 2.
Figure 3B:
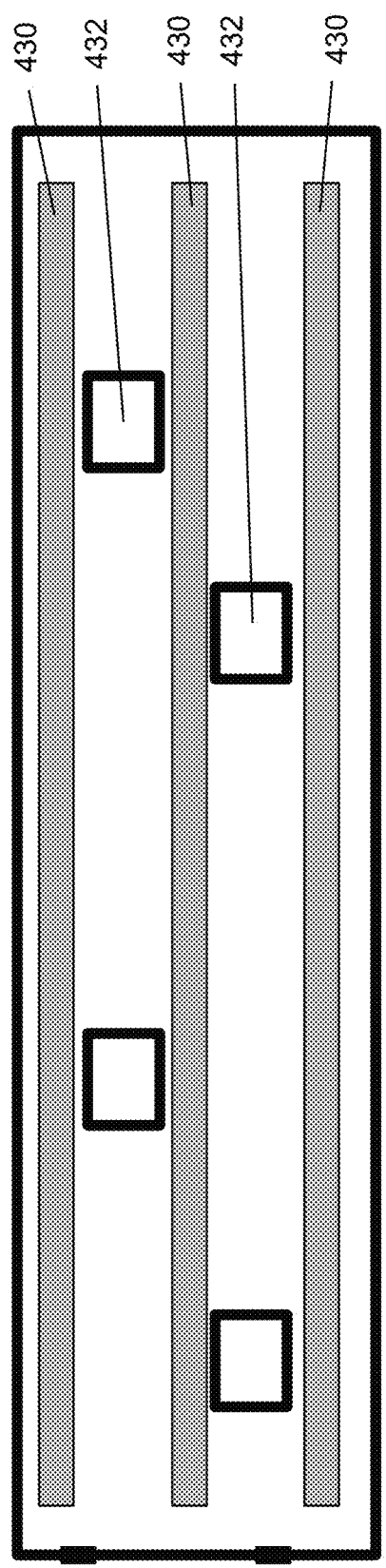

Reference is now made to FIGS. 3A and 3B which are two schematic illustrations of the underside of a static cover of a waste curing device according to an embodiment of the invention in which three LED strips 430 are used. In order to accommodate the three strips, openings 432 for the insertion of waste nozzles are provided in two rows in the gaps between the strips. Thus the strips with the LEDs are not aligned in the width direction with the openings for the waste insertion nozzles. FIG. 3B shows the strips and openings schematically and FIG. 3A shows the positions of individual LED lamps 434 along the strips.

Figure 4:
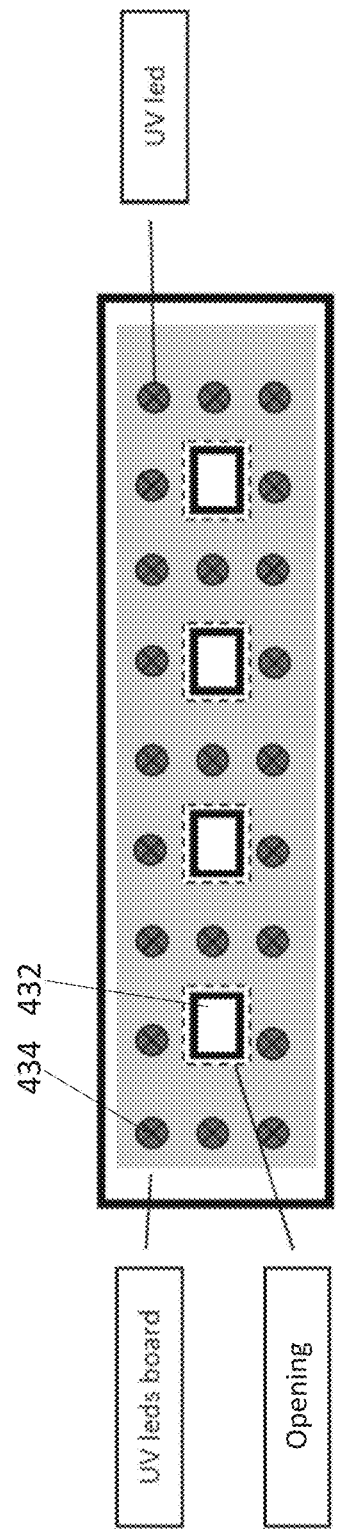
FIG. 4 is a schematic illustration showing an under view of an alternative embodiment of the static cover of FIGS. 3A and 3B.

FIG. 4 is a variation of FIGS. 3A and 3B in which a single line of nozzle openings 432 is shown. The LEDs 434 are individual LED lamps fitted onto a board and are positioned around each opening.

In some embodiments, preferably and typically, the size of the openings 432 is larger than the tips of the waste nozzles, and sufficiently large to ensure that material dripping or jetted from the waste nozzles falls through the openings and is not sprayed onto the cover surface.

In some embodiments, the nozzle openings have a maximum diameter of 2 mm. Such a maximum diameter makes it easier to control the amount of waste jetted in each cycle, which is useful particularly if the number of jetting operations is being used to measure the quantity of waste being collected. Furthermore, such a size assists with pulse formation to form a burst of waste.

Figure 5:
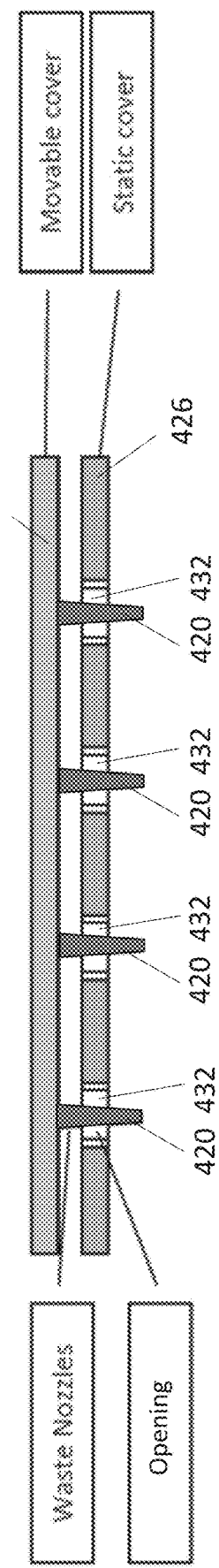
FIG. 5 is a schematic illustration showing a side view of an arrangement of a movable cover and a static cover in open position, wherein the nozzles of the movable cover (as shown in FIG. 2) protrude through openings of the static cover.
Figure 6:
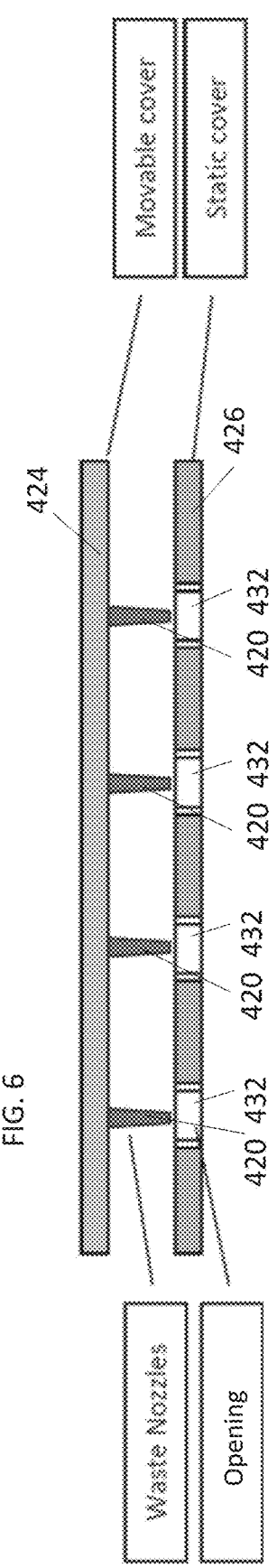
FIG. 6 is a schematic illustration showing a side view of an arrangement of a movable cover and a static cover in open position, wherein the nozzles of the movable cover (as shown in FIG. 2) are positioned above the openings of the static cover.
Figure 7:
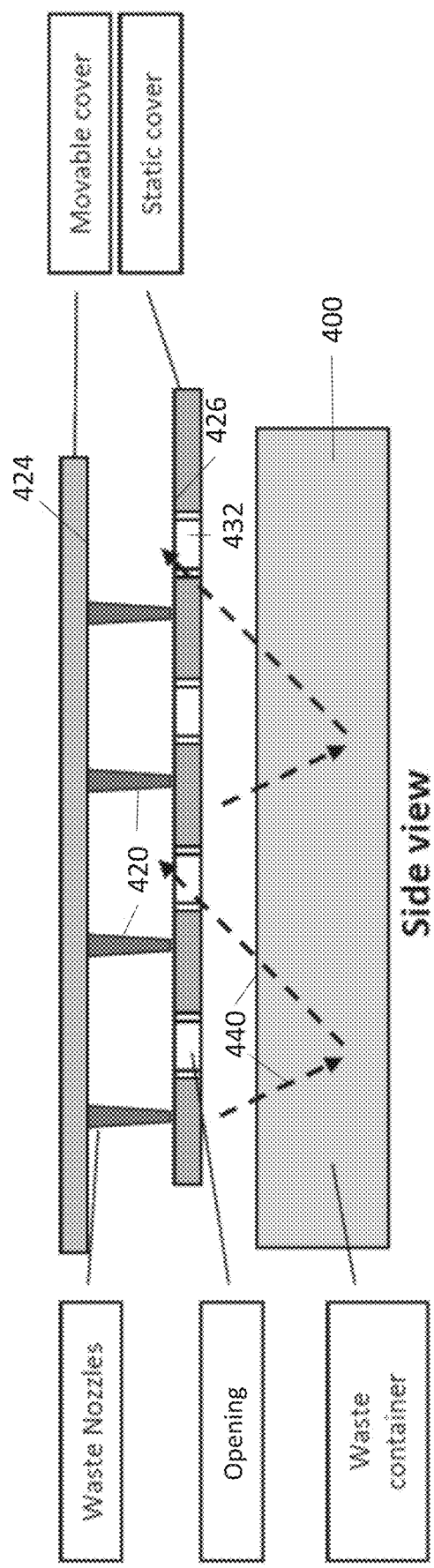
FIG. 7 is a schematic illustration showing a side view of an arrangement of a movable cover and a static cover in closed position, wherein the nozzles of the movable cover (as shown in FIG. 2) are shielded from curing radiation by the static cover.

Reference is now made to FIGS. 5-7 which show side views of successive positions of the static 426 and movable 424 covers over the course of a cycle according to embodiments of the present invention. FIG. 5 shows a jetting position used in some embodiments of the present invention in which the waste nozzles 420 in the movable cover 424 are aligned with respective openings 432 in the static cover, and the movable cover is then moved into proximity with the static cover such that the waste nozzles 420 are inserted through the openings 432. The advantage is that the jets of material are delivered from a position that is clear of the LED lamps 410 and thus contamination of the LED lamps by spraying of waste material is kept to a minimum.

In FIG. 6 the movable cover 424 has been raised so that the waste nozzles are not inserted in the opening, thus allowing the movable cover to be moved sideways. In some embodiments, where the movable cover is only movable horizontally, the position shown in FIG. 6 is the open position that is used for jetting or pumping the waste material into the container 400, and there is no equivalent of the FIG. 5 position. Thus depending on the embodiment, either FIG. 5 or FIG. 6 represent an open position. The skilled person will bear in mind that additional embodiments are contemplated in which the cover with the waste insertion nozzles is static and the cover with the openings is a movable cover.

FIG. 7 illustrates the closed position. Movable cover 424 has been moved in a horizontal direction such that the waste nozzles 420 are no longer aligned with openings 432 in the static cover. The static cover now serves as a shield to protect the waste nozzles from reflection of the curing radiation. Dotted lines 440 indicate a passage of light of the curing radiation onto the waste in container 400 and its possible at least partial reflection back towards the openings 432. The tips of the waste nozzles are located close to the top surface of static cover 426 and are thus shielded from stray radiation.

Figure 8A:
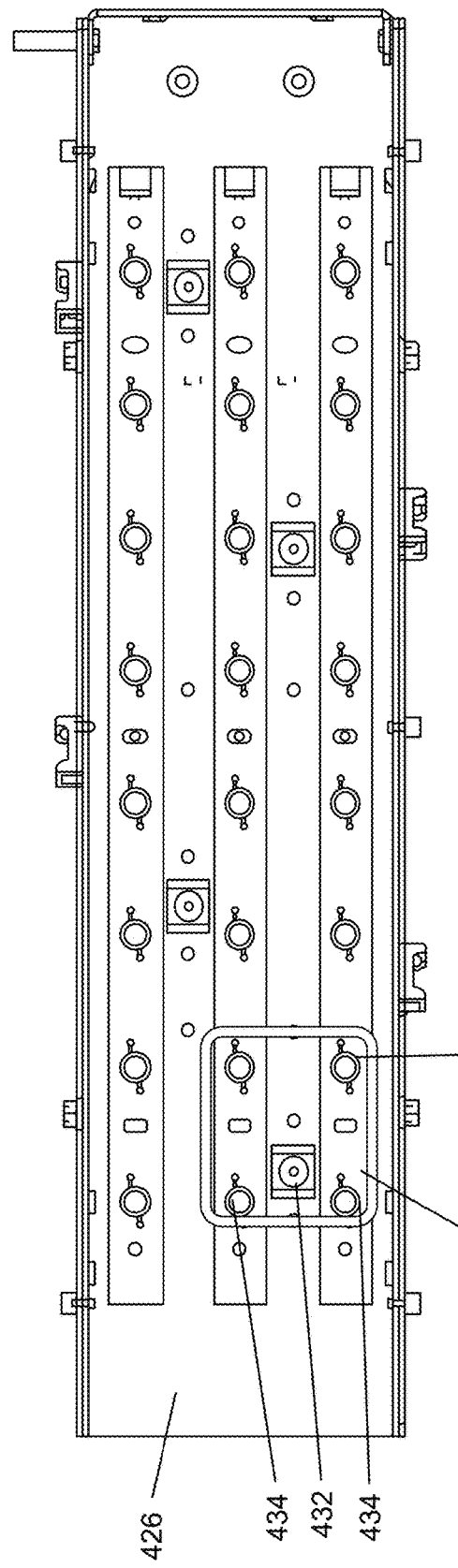
FIGS. 8A and 8B are comparative schematic illustrations showing an under view of two embodiments of a static cover, showing different alignments of curing lamps around the nozzle openings.
Figure 8B:
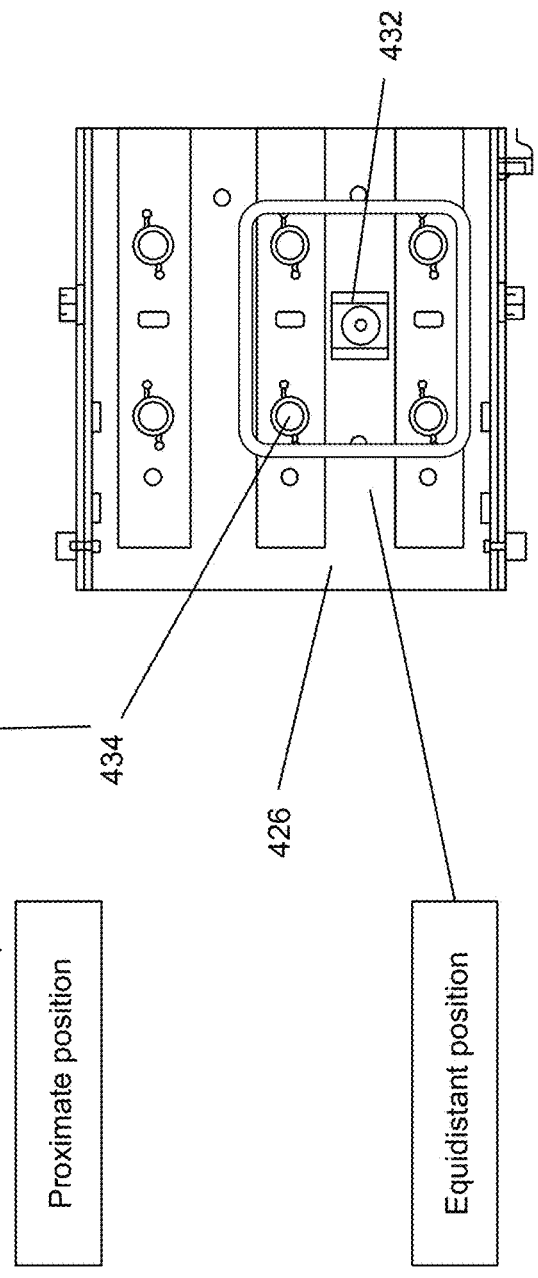

Reference is now made to FIGS. 8A and 8B, which show two slightly different layouts for LED lamps around openings in the underside of static cover 426. In FIG. 8A, some of the LEDs 434 are in close proximity to the openings 432, and in FIG. 8B the LEDs are equally distanced from the openings. An advantage of the latter embodiment, is that the LED lamps are less exposed to waste splashing from the nozzles.

Figure 9:
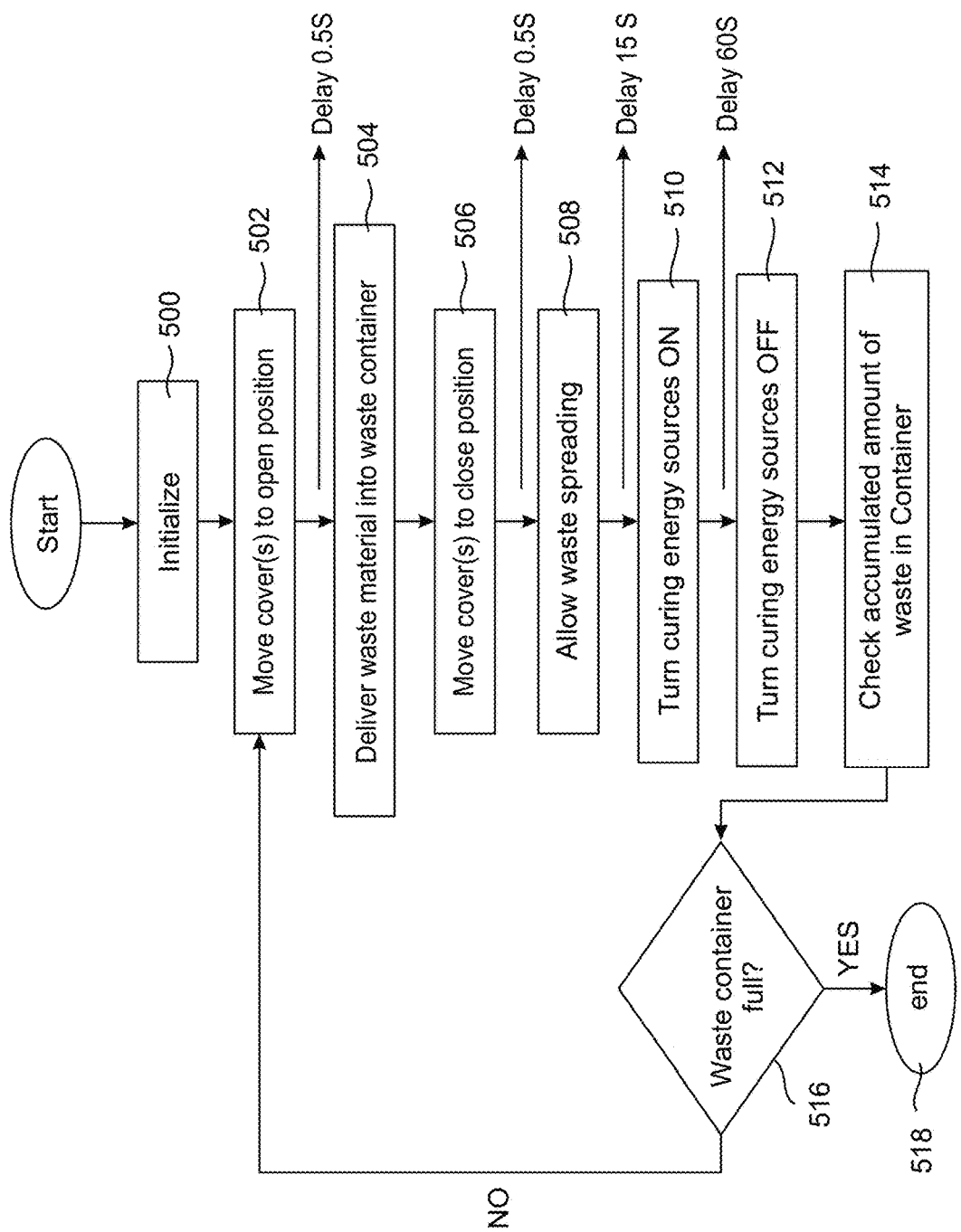
FIG. 9 is a flow diagram showing an exemplary operation of a curing system according to an embodiment of the present invention.

Reference is now made to FIG. 9 which is a simplified flow chart illustrating operation of the waste collection and curing system. In use, as mentioned above, the controller may operate the waste curing device 600 on each occasion that a specified amount of waste has been generated by the waste generating elements 412 of the 3D printer. Thus, the system is initialized 500 and the movable cover is moved to the open position 502. A delay may be introduced between switching to an opening position and the beginning of delivery of waste material into the waste container, the delay being shown as half a second by way of example. Delivery of waste material into the waste container is carried out 504, and while delivering, the energy sources are turned off, and the specified amount of waste material is accumulated in the waste container. Delivery of waste material via the waste nozzles can be done simultaneously or sequentially. In some embodiments, sequential delivery is selected so as to allow an equivalent amount of waste material to be fed via each nozzle and enable faster and more even spreading of the waste material in the container. Delivery is then halted and the covers are moved relative to each other to a closed position 506, thereby closing the openings and shielding the waste nozzles. In some embodiments, a delay is introduced at this point, to provide time between the end of waste delivery into the waste container and the start of curing, for the uncured waste newly accumulated in the container to spread out evenly in the container 508. Here by way of example the delay is shown to be half a second to allow drips to cease and the cover to close followed by a second delay of 15 seconds for the material to spread. Allowing the drips to complete may prevent formation of stalactites, and allowing the waste to spread may prevent lumps that only get partially cured because the radiation fails to reach inside the lump. Furthermore, a smooth surface is left for the next step, removing shadows and helping with even spreading of the next round of ink.

After the delay, energy sources (e.g. LEDs) are turned on 510 for a specific amount of time adequate to fully cure the new layer of accumulated waste—here shown by way of example as 60 seconds. Curing time can be adjusted according to the type of waste material being cured and the amount of material delivered into the container in each cycle. Then energy sources are turned off 512 and the total amount of material accumulated in the container is sampled or measured 514. If the container is full 516 then the procedure ends 518. If not, the delivery and curing cycle is repeated from 502. In some embodiments, a delivery and curing cycle takes about 1.5 min and an amount of waste material delivered and cured in a cycle is about 3 to 10 g. An exemplary rate of waste delivery and curing is about 120 to 400 g per hour, for instance 155 g/h.

Thus, irrespective of whether waste delivery is fast or slow, the same amount of waste receives the same amount of curing energy, and waste delivery in general becomes scalable for different speeds of operation and different rates of waste production.

Figure 10A:
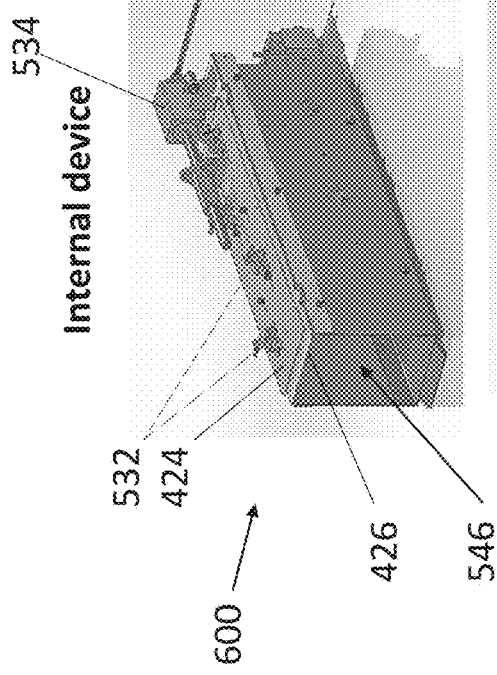
FIGS. 10A and 10B are two different perspective views of an internal curing device according to embodiments of the present invention.
Figure 10B:
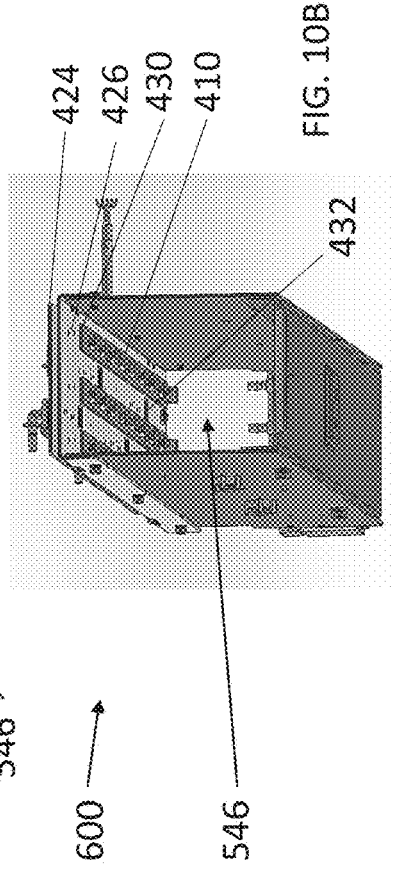

Reference is now made to FIGS. 10A and 10B, which are schematic illustrations showing an embodiment of an internal waste curing device 600 from side and front perspective views respectively. The device 600 is fitted internally into a 3D printer and includes waste inlets 532 for flow of waste. Motor housing 534 houses motor 422 (see FIG. 2) that moves movable cover 424 and the energy sources (e.g. LEDs) 410 can be seen in strips 430 on the underside of the static cover 426 along with openings 432 for the waste nozzles. Waste collection containers are inserted into container compartment 546 and replaced when full.

Figure 11A:
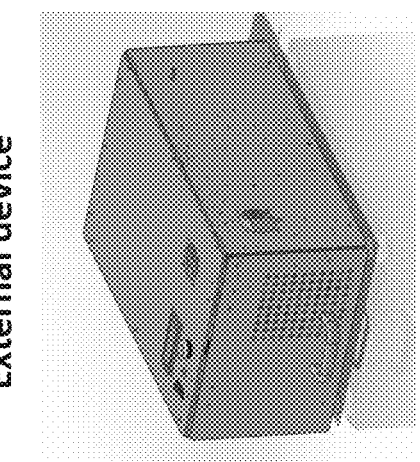
FIGS. 11A and 11B are two different perspective views of an external curing device intended for connection to a 3D printing device.
Figure 11B:
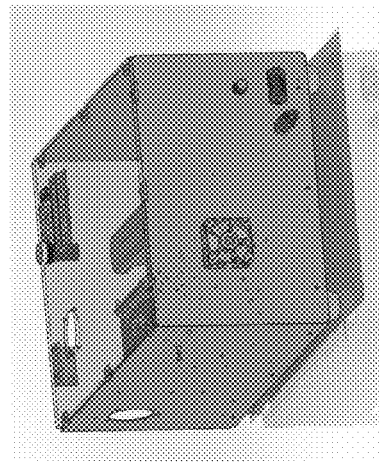

FIG. 11A and FIG. 11B show two different perspective views of an external waste curing device according to another embodiment of the invention. The external device is an add-on for an existing 3D printer and may be connected to a pipe that leads to the internal waste material collector of the printer. Alternatively, the waste material collector of the 3D printer is taken out of the printer and connected to the external waste curing device, while a new waste material collector is inserted into the 3D printer.

Figure 12B:
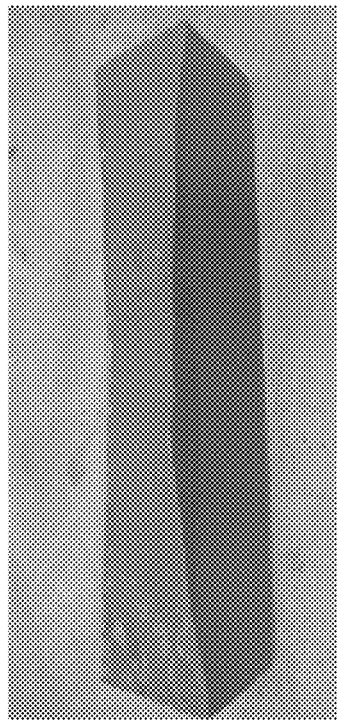
FIGS. 12A-12D is a series of photographs showing slabs of cured waste material, produced using embodiments of the present invention.
Figure 12D:
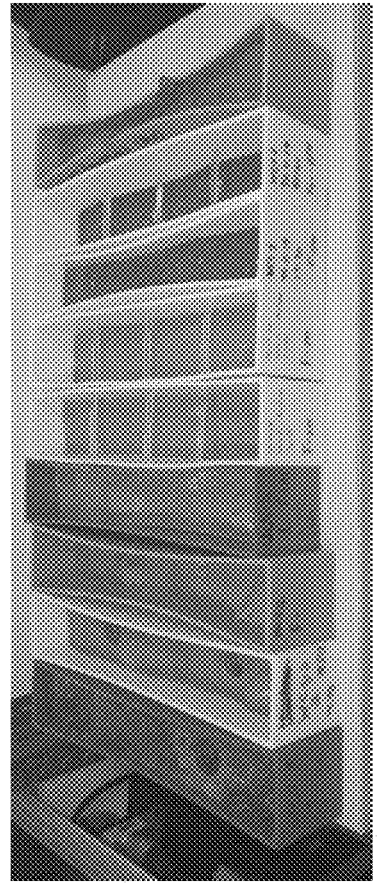
Figure 12A:
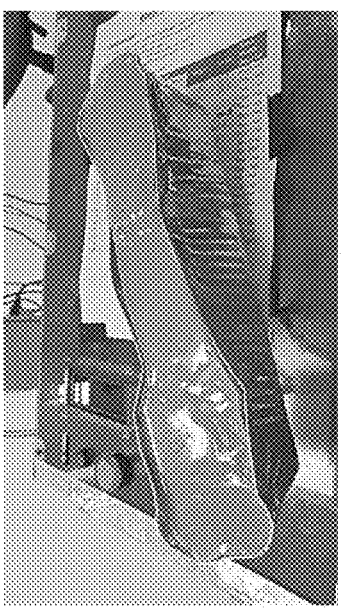
Figure 12C:
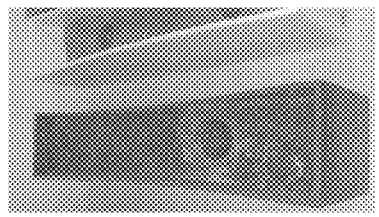

FIGS. 12A-12D are a series of photographs of the end result of the current process, in which slabs of cured waste material are shown. More specifically, FIG. 12A shows a slab of cured waste material in a disposable container; FIG. 12B shows a slab of cured waste material after being removed from its container; FIG. 12C shows a slab of cured waste material from which a cylindrical sample was taken to determine the degree of curing; FIG. 12D shows a number of slabs of cured waste material each of which was generated by a different combination of building materials. Each of the masses or slabs may be at least 95% cured.

It is expected that during the life of a patent maturing from this application many relevant additive manufacturing and curing technologies will be developed and the scopes of the terms "additive manufacture" and "curing" are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A waste curing device to cure waste generated by an additive manufacturing system, the waste curing device comprising:
 a container for receiving said waste;
 a movable cover positioned above said container;
 a static cover positioned above said container;
 one or more waste nozzles configured to deliver waste into said container; and
 one or more curing sources configured to provide curing radiation to cure said waste in said container;
 wherein said movable cover is configured to move relative to said static cover to provide an open position for said one or more waste nozzles to deliver waste into said container, and subsequently to a closed position, to shield said one or more waste nozzles from said curing radiation.

2. The waste curing device of claim 1, wherein said static cover is positioned below said moveable cover, said one or more waste nozzles are mounted on said moveable cover and said one or more curing sources are mounted on said static cover.

3. The waste curing device of claim 1, wherein said moveable cover is positioned below said static cover, said one or more waste nozzles are mounted on said static cover and said one or more curing sources are mounted on said moveable cover.

4. The waste curing device of claim 1, further comprising a controller configured to control relative movement of said movable cover and to control delivery of a predetermined amount of waste by said one or more waste nozzles into said container.

5. The waste curing device of claim 4, wherein said controller is configured to control said one or more curing sources to provide said curing radiation.

6. The waste curing device of claim 5, wherein said controller is configured to introduce a delay between receipt of waste by said container after a predetermined amount of waste has been delivered to said container, and said control of said one or more curing sources, for said delivery of curing radiation by said one or more curing sources.

7. The waste curing device of claim 4, wherein said predetermined amount of waste is gauged by a change in weight of said waste and/or a change of height of said waste in said container.

8. The waste curing device of claim 4, wherein said one or more curing sources are configured to operate for at least an amount of time needed to cure the predetermined amount of waste material delivered.

9. An additive manufacturing system comprising:
a dispensing unit comprising a plurality of dispensing heads for dispensing a liquid building material formulation;
one or more building material formulation reservoirs;
a working surface onto which said building material is dispensed in layers;
a leveling device for straightening, leveling and/or establishing a thickness of said layers;
a waste collection device for collecting excess building material formulation; and
a waste curing device, the waste curing device comprising:
a container for receiving said waste;
a movable cover positioned above said container;
a static cover positioned above said container;
one or more waste nozzles configured to deliver waste into said container; and
one or more curing sources configured to provide curing radiation to cure said waste in said container;
wherein said movable cover is configured to move relative to said static cover to provide an open position for said one or more waste nozzles to deliver waste into said container, and subsequently to a closed position, to shield said one or more waste nozzles from said curing radiation.

* * * * *